US011934149B2

(12) United States Patent
Semon et al.

(10) Patent No.: US 11,934,149 B2
(45) Date of Patent: Mar. 19, 2024

(54) DEVICE FOR TIMEPIECE, TIMEPIECE MOVEMENT AND TIMEPIECE COMPRISING SUCH A DEVICE

(71) Applicant: LVMH Swiss Manufactures SA, La Chaux-de-Fonds (CH)

(72) Inventors: Guy Semon, Evette-Salbert (FR); Thomas Mercier, La Chaux-de-Fonds (CH); Florian Danard, Avrille (FR); Wout Johannes Benjamin Ypma, Delft (NL); Maarten Pieter Lustig, Delft (NL)

(73) Assignee: LVMH Swiss Manufactures SA, La Chaux-de-Fonds (CH)

( * ) Notice: Subject to any disclaimer, the term of this patent is extended or adjusted under 35 U.S.C. 154(b) by 666 days.

(21) Appl. No.: 16/465,912

(22) PCT Filed: Nov. 30, 2017

(86) PCT No.: PCT/EP2017/081087
§ 371 (c)(1),
(2) Date: May 31, 2019

(87) PCT Pub. No.: WO2018/100122
PCT Pub. Date: Jun. 7, 2018

(65) Prior Publication Data
US 2020/0073329 A1 Mar. 5, 2020

(30) Foreign Application Priority Data
Dec. 1, 2016 (FR) ...................................... 16 61782

(51) Int. Cl.
*G04B 15/08* (2006.01)
*G04B 15/14* (2006.01)

(52) U.S. Cl.
CPC ............. *G04B 15/14* (2013.01); *G04B 15/08* (2013.01)

(58) Field of Classification Search
CPC ........ G04B 15/00; G04B 15/06; G04B 15/08; G04B 15/14
See application file for complete search history.

(56) References Cited

U.S. PATENT DOCUMENTS 7,950,846 B2 * 5/2011 Hessler .................. G04B 17/20 368/127
8,770,828 B2 * 7/2014 Ching .................. G04B 17/066 368/175
(Continued)

FOREIGN PATENT DOCUMENTS

CH 428578 A 8/1966
CH 448 578 A 12/1967
(Continued)

OTHER PUBLICATIONS

Notice of Reasons for Rejection related to Japanese Application No. 2019-529590; dated Oct. 4, 2021.
(Continued)

*Primary Examiner* — Sean Kayes
(74) *Attorney, Agent, or Firm* — von Briesen & Roper, s.c.

(57) ABSTRACT

A device for a timepiece, comprising a support, an inertial regulating member mounted so as to rotate relative to the support by an elastic suspension connecting said regulating member to the support. The regulating member comprises a number n of rigid portions interconnected in pairs by n elastic coupling links. The elastic suspension comprises n elastic suspension links respectively connecting each rigid portion to the support.

24 Claims, 10 Drawing Sheets

(56) References Cited

U.S. PATENT DOCUMENTS

| | | | | |
|---|---|---|---|---|
| 9,075,394 | B2 * | 7/2015 | Stranczl | G04B 15/06 |
| 9,465,363 | B2 * | 10/2016 | Winkler | G04B 17/045 |
| 10,372,082 | B2 * | 8/2019 | Semon | G04B 15/00 |
| 10,528,005 | B2 * | 1/2020 | Semon | G04B 1/225 |
| 2015/0131413 | A1 * | 5/2015 | Helfer | G04C 3/047<br>368/80 |

FOREIGN PATENT DOCUMENTS

| | | | |
|---|---|---|---|
| EP | 2 911 012 | A1 | 8/2015 |
| EP | 2 995 999 | A1 | 3/2016 |
| EP | 3 035 127 | A1 | 6/2016 |
| EP | 2911012 | B1 | 7/2020 |
| JP | 2012027018 | A | 2/2012 |
| JP | 2013531257 | A | 8/2013 |
| JP | 2016118548 | A | 6/2016 |
| JP | 2016153789 | A | 8/2016 |
| WO | 2016079068 | A1 | 5/2016 |
| WO | 2016091823 | A1 | 6/2016 |
| WO | WO 2016091823 | A1 | 6/2016 |
| WO | WO 2016091951 | A1 | 6/2016 |

OTHER PUBLICATIONS

International Search Report related to Application No. PCT/EP2017/081087; dated Apr. 3, 2018.

* cited by examiner

DEVICE FOR TIMEPIECE, TIMEPIECE MOVEMENT AND TIMEPIECE COMPRISING SUCH A DEVICE

CROSS-REFERENCE TO RELATED APPLICATION

This Application is a 35 USC § 371 US National Stage filing of International Application No. PCT/EP2017/081087 filed on Nov. 30, 2017, and claims priority under the Paris Convention to French Patent Application No. 16 61782 filed on Dec. 1, 2016.

FIELD OF THE DISCLOSURE

The present invention relates to devices for timepieces, as well as timepiece movements and timepieces comprising such devices.

BACKGROUND OF THE DISCLOSURE

There are known devices for timepieces comprising a planar mechanism extending in a mid-plane, said mechanism comprising:

- a support,
- an inertial regulating member connected to the support by an elastic suspension, said inertial regulating member having a substantially axial symmetry of order n relative to a central axis orthogonal to said mid-plane and fixed relative to the support, n being a whole number at least equal to 2.

Document WO2016091823A1 describes an example of such a device.

The present invention aims to perfect devices of this type, in particular to improve their timekeeping precision.

SUMMARY OF THE DISCLOSURE

For this purpose, according to the invention, a device of the type in question is characterized in that said inertial regulating member comprises a number n of rigid portions interconnected in pairs by n elastic coupling links,

- and in that the elastic suspension comprises n elastic suspension links respectively connecting each rigid portion to the support.

With these arrangements, overstressing of the inertial regulating member and its elastic suspension is avoided, which improves the isochronism of the mechanism.

In various embodiments of the device according to the invention, it may be also possible to make use of one or more of the following arrangements:

- the inertial regulating member is movable substantially in rotation about said central axis;
- the rigid portions of the inertial regulating member are movable both in rotation and in radial translation relative to the central axis;
- the elastic suspension links each comprise at least one elastic arm;
- the number n is at least equal to 3 and each rigid portion is connected to two adjacent rigid portions respectively by two elastic coupling links;
- the number n is equal to 3;
- the rigid portions each comprise a part in the form of a circular arc centered on the central axis;
- the parts in the form of a circular arc are adjacent to one another and together form a discontinuous ring;

- the parts in the form of a circular arc each extend angularly between a first end and a second end which overlap one another in an angular direction;
- the parts in the form of a circular arc each extend angularly between a first end and a second end, the second end being extended radially by a rigid arm terminating in a jaw extending angularly beyond the second end, and each elastic coupling link comprising at least one elastic coupling arm extending substantially radially relative to the central axis and connecting said jaw of each rigid portion to the first end of the circular arc-shaped part of an adjacent rigid portion;
- the support comprises at least one central part surrounded by the rigid portions of the inertial regulating member, and each elastic suspension link comprises at least on elastic suspension arm extending substantially radially inward from the corresponding rigid portion to said central part of the support;
- the mechanism further comprises an anchor adapted to engage with an energy distribution member provided with teeth and intended to be urged by an energy storage device, said anchor being controlled by said inertial regulating member to regularly and alternately block and release the energy distribution member, such that said energy distribution member moves step by step under the urging of the energy storage device in a cycle of repetitive movement, and said anchor being adapted to transfer mechanical energy to said inertial regulating member during this cycle of repetitive movement;
- said anchor is connected to the support by two elastic anchor suspension arms and to one of the rigid portions of the inertial regulating member by at least one elastic driving arm;
- the elastic anchor suspension arms are arranged so that said anchor is movable substantially in rotation about a supplemental rotation axis parallel to said central axis;
- the anchor comprises a main rigid body which comprises two stopping means adapted to engage with the teeth of the energy distribution member, the main rigid body of the anchor being arranged internally relative to the part in the form of a circular arc of one of rigid portions, and the anchor further comprising a rigid driving arm integral to the main rigid body and connected to the rigid arm of said rigid portion by said elastic driving arm;
- the device comprises movement limitation means adapted to limit the displacements of at least one rigid portion of the inertial regulating member relative to the support;
- said movement limitation means limit an angular displacement of said at least one rigid portion of the inertial regulating member relative to the support, about the central axis;
- said movement limitation means comprise a slot formed in said at least one rigid portion of the inertial regulating member and extending angularly around the central axis, and a pin integral to the support and arranged in the slot;
- said movement limitation means comprise a rigid movement limitation arm that is part of said at least one rigid portion of the inertial, regulating member, and two additional movement limitation members which are part of the support and which radially frame said rigid movement limitation arm, said rigid movement limitation arm extending angularly relative to the central axis;

the rigid movement limitation arm comprises a free end provided with a head that is enlarged in the radial direction, said head being wider than the spacing between the two additional movement limitation members that are part of the support;

the enlarged head can move angularly within a recess in the form of a circular arc centered on the central axis, which is formed in the support, the opening of said recess in said support being a narrow opening bounded by two edges which are part of said support and which form said additional movement limitation members;

the support is arranged at least partially around the inertial regulating member, each rigid portion comprising a part in the form of a circular arc centered on the central axis and a rigid arm extending from the part in the form of a circular arc to an inner end near the central axis, each elastic suspension link comprising an elastic suspension arm connecting the support to the inner end of the rigid arm and extending substantially radially relative to the central axis, and each elastic coupling link comprising at least one elastic coupling arm connecting the part in the form of a circular arc of a rigid portion to the first end of the rigid arm of an adjacent rigid portion, said elastic coupling arm extending substantially radially relative to the central axis.

The invention also concerns a timepiece movement comprising the device as defined above and an energy distribution member provided with teeth and intended to be urged by an energy storage device, said device comprising an anchor adapted to engage with the energy distribution member, said anchor being controlled by said inertial regulating member to regularly and alternately block and release the energy distribution member, such that said energy distribution member moves step by step under the urging of the energy storage device in a cycle of repetitive movement, and said anchor being adapted to transfer mechanical energy to said inertial regulating member during this cycle of repetitive movement.

Finally, the invention also concerns a timepiece comprising a movement as defined above.

BRIEF DESCRIPTION OF DRAWINGS

Other features and advantages of the invention will be apparent from the following description of several of its embodiments, given as non-limiting examples, with reference to the appended drawings.

In the drawings.

DETAILED DESCRIPTION

In the various figures, the same references designate identical or similar elements.

Figure 1:
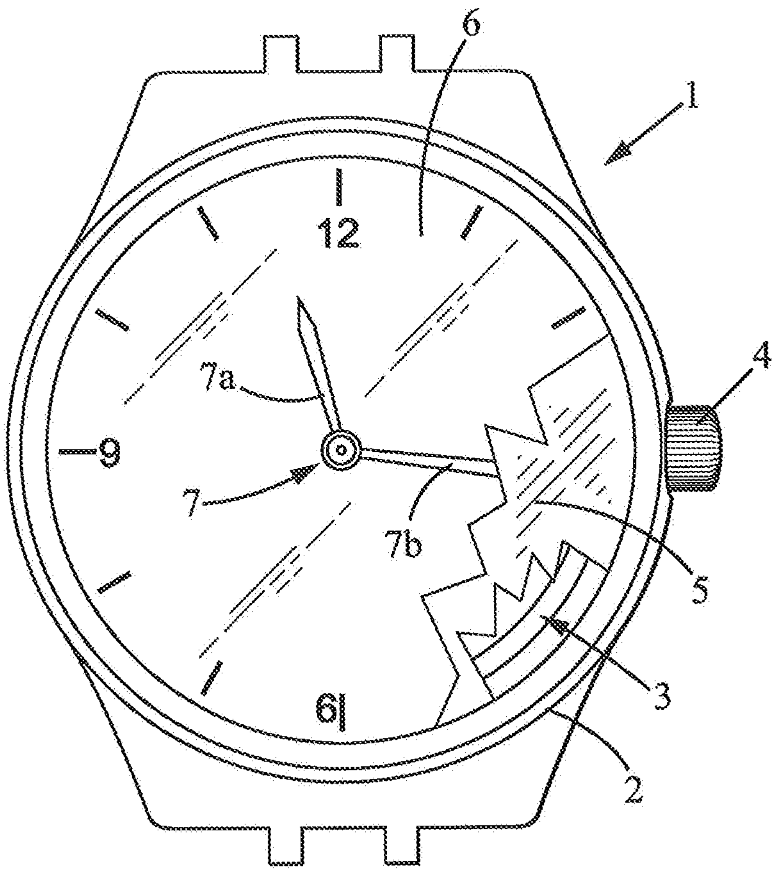
FIG. 1 is a schematic view of a timepiece that can comprise a mechanism according to an embodiment of the invention.

FIG. 1 represents a timepiece 1 such as a watch, comprising:

a case 2, a timepiece movement 3 contained in case 2, generally, a winding mechanism 4, a dial 5, glass 6 covering the dial 5, a time indicator 7, comprising for example two hands **7*a*, 7*b* respectively for the hours and minutes, positioned between glass 6 and dial 5 and actuated by timepiece movement 3**.

Figure 2:
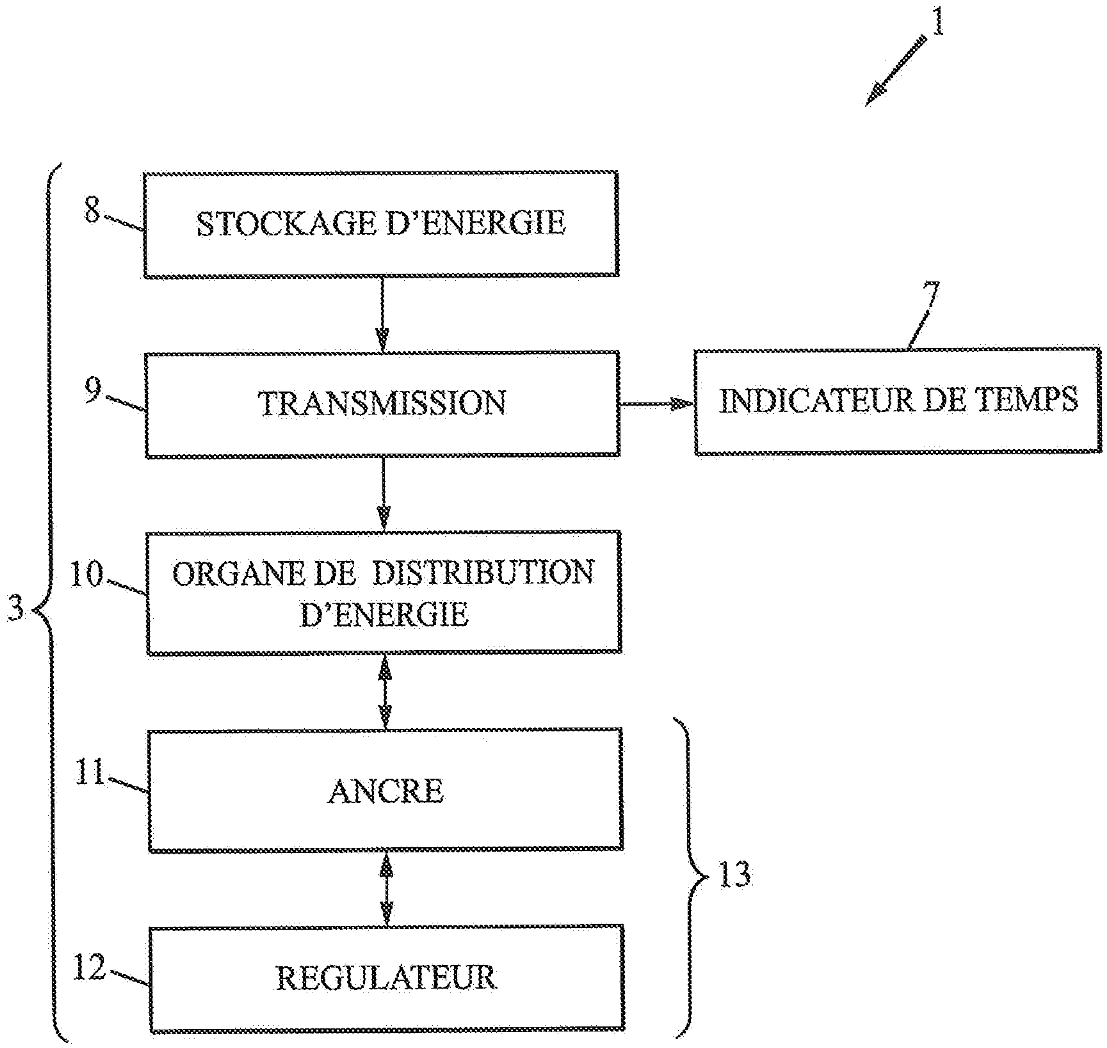
FIG. 2 is a block diagram of the movement of the timepiece of FIG. 1.

As schematically represented in FIG. 2, the timepiece movement 3 may comprise for example:

a mechanical energy storage device 8, usually a barrel spring, a mechanical transmission 9 driven by mechanical energy storage device 8, the abovementioned time indicator 7, an energy distribution member 10 (for example an escapement), an anchor 11 adapted to sequentially retain and release the energy distribution member 10, a regulator 12, which is a mechanism comprising an oscillating inertial regulating member, controlling anchor 11 in regular movements so that the energy distribution member 10 is moved step by step at constant time intervals.

Anchor 11 and regulator 12 form a planar mechanism. As represented in the various figures, planar mechanism 13 is advantageously a monolithic system formed in a same plate 14 (usually flat) and whose moving parts are designed to move mainly in a mid-plane of said plate 14.

Plate 14 may be of low thickness, for example approximately 0.05 mm to approximately 1 mm, depending on the nature of the material of plate 14.

Plate 14 may have transverse dimensions, in the XY plane of the plate (width and length, or diameter), comprised between approximately 10 mm and 40 mm. X and Y are two perpendicular axes defining the plane of plate 14.

Plate 14 may be manufactured using any suitable rigid material, preferably having a low Young's modulus in order to provide good elasticity properties and a low frequency of oscillation, Examples of materials that can be used to create plate 14 include silicon, nickel, iron/nickel alloy, steel, and titanium. In the case of silicon, the thickness of plate 14 can for example be between 0.2 mm and 0.6 mm.

"Monolithic mechanism" is understood here to mean a mechanism composed of elements which, by the nature or form of their assembly, are integral to one another to the point that any deformation of one component causes deformation of the other parts. The monolithic mechanism may advantageously be formed from a single piece of material, possibly treated to present an external layer of a different nature than the rest of the material (for example an oxidized layer). Alternatively, the monolithic mechanism may also comprise some parts that are mounted (for example glued, welded, or other) in the plane of the plate.

The various members formed in plate 14 are obtained by creating openings in plate 14, obtained by any manufacturing process used in micromechanics, in particular the processes used for the manufacture of MEMS.

In the case where plate 14 is made of silicon, the plate 14 may be locally hollowed out, for example by deep reactive ion etching (DRIE) or possibly by laser cutting in the case of small series.

When plate 14 is made of iron/nickel, the plate 14 could be created by the LIGA process, or by laser cutting.

When plate 14 is made of steel or titanium, plate may be hollowed out for example by wire electrical discharge machining (WEDM).

The constituent parts of the mechanism will now be described in more detail. Some of these parts are rigid and others (in particular those referred to as "elastic arms") are elastically deformable, mainly in bending. The difference between the rigid parts and the elastic parts is their stiffness in the XY plane of plate 14, which is due to their shape and in particular their slenderness. The slenderness can be measured in particular by the slenderness ratio (ratio of length/width of the part concerned). For example, the rigid parts have a stiffness at least 100 times greater in the XY plane than the elastic parts.

Typical dimensions for the elastic links, for example the elastic arms which will be described below, include lengths for example between 5 mm and 13 mm and widths for example between 0.01 mm (10 μm) and 0.04 mm (40 μm), in particular about 0.025 mm (25 μm). Taking into account the widths of the beams and the thickness of plate 14, the slenderness ratio of these beams in longitudinal section is between 5 and 60. The largest possible slenderness ratio is preferred, in order to limit oscillation outside the plane.

Plate 14 comprises a support 15, 115, 215, 315 which is secured to a support plate 14*a*, for example by screws or similar (not represented) passing through holes 15*a*, 115*a*, 215*a*, 315*a* of support 15, 115, 215, 315. Support plate 14*a* is secured to case 2 of timepiece 1.

Energy distribution member 10 may be an escapement mounted so as to rotate for example on support plate 14*a*, in a manner enabling its rotation about a rotation axis Z1 perpendicular to plane XY of plate 14. Energy distribution member 10 is urged by energy storage device 8 in a single rotation direction 16.

Energy distribution member 10 has external teeth 17.

In all embodiments of the invention, the inertial regulating member of regulator 12 is connected to support 15, 115, 215, 315 by an elastic suspension connecting. More specifically, said inertial regulating member 18 has a substantially axial symmetry of order n relative to a central axis Z0 orthogonal to the mid-plane XY and fixed in relation to support 15, 115, 215, 315. Has a substantially axial symmetry of order n" is understood to mean that the inertial regulating member 18 essentially follows this symmetry, but that some parts of relatively negligible mass may not have this symmetry (for example parts serving to couple the anchor to the inertial regulating member).

Said inertial regulating member 18 comprises a number n of rigid portions interconnected in pairs by n elastic coupling links, n being a whole number at least equal to 2.

The elastic suspension comprises n elastic suspension links respectively connecting each rigid portion of the inertial regulating member to support 15, 115, 215, 315.

In particular, the elastic suspension may be provided such that inertial regulating member 18; 118; 218; 318 is movable substantially in rotation about central axis Z0.

The number n is advantageously equal to 3; however, it may be equal to 2 or to more than 3. When the number n is 3 or more, each rigid portion of the inertial regulating member is respectively connected to two adjacent rigid portions of the inertial regulating member by two elastic coupling links.

First Embodiment

Figure 3:
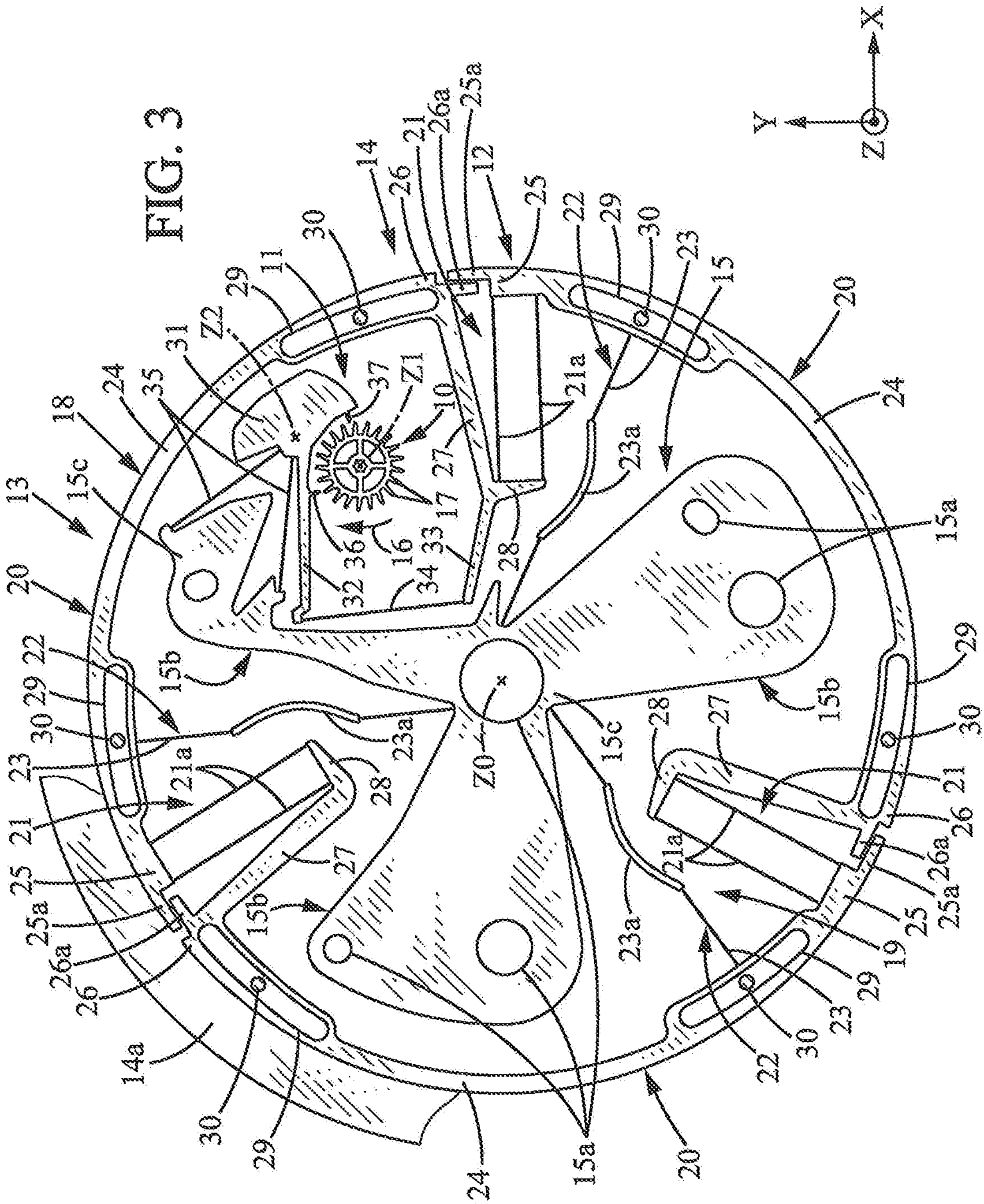
FIG. 3 is a plan view of part of the movement of FIG. 2 according to a first embodiment of the invention, comprising the regulator, the anchor, and the energy distribution member.
Figure 4:
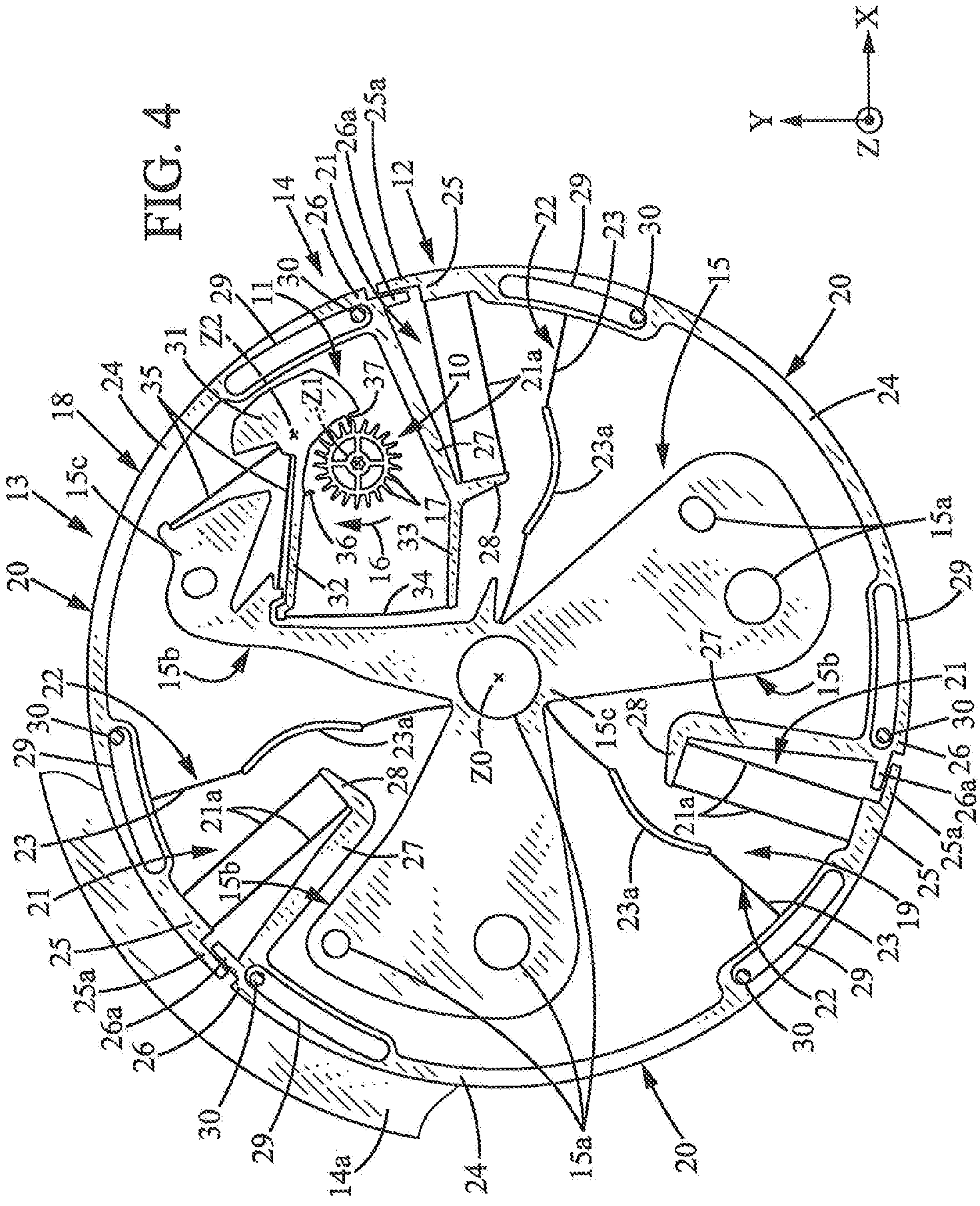
FIGS. 4 and 5 are views similar to FIG. 3, showing two extreme positions of the mechanism.
Figure 5:
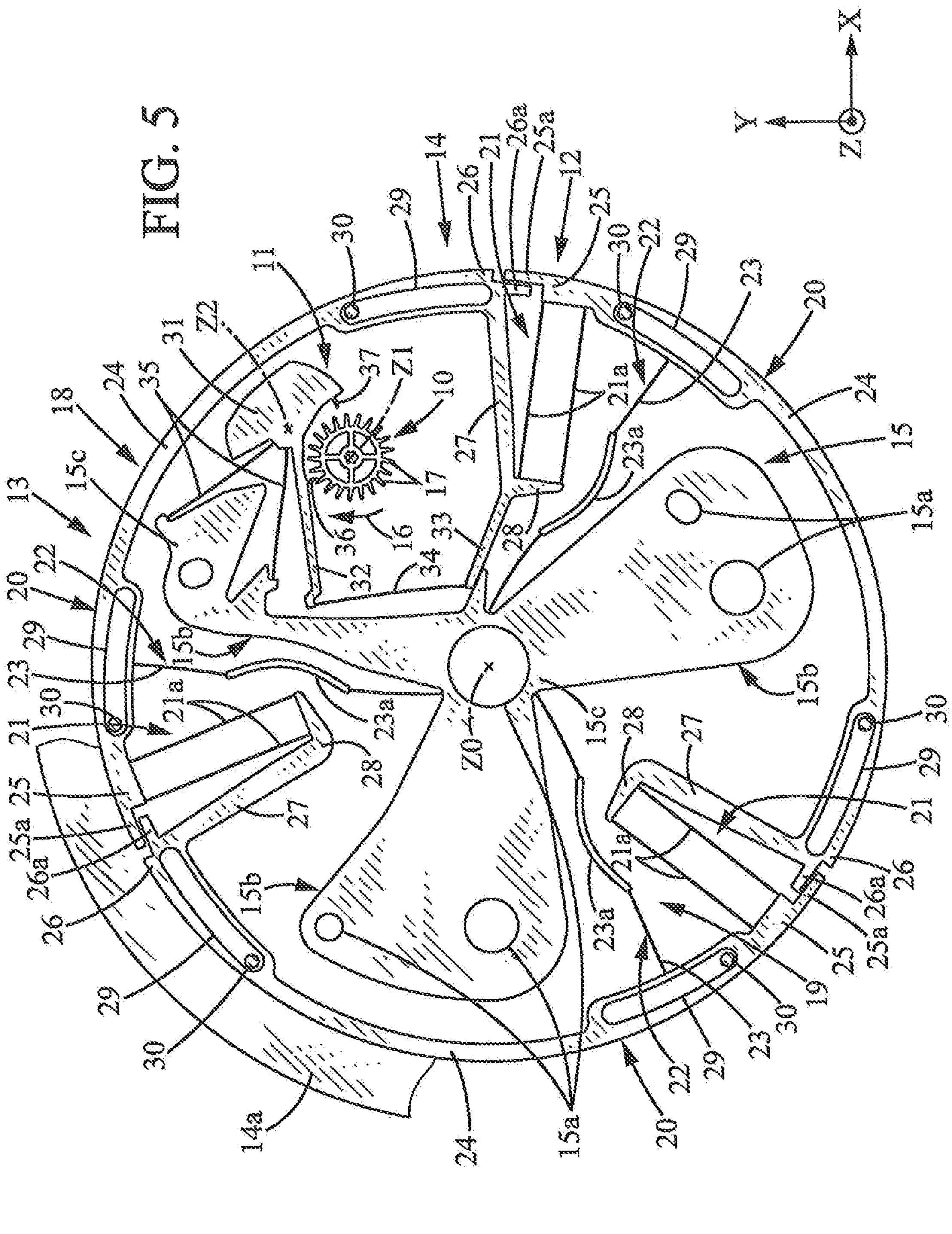

In the first embodiment of the invention, represented in FIGS. 3 to 5, the number n is equal to 3. Inertial regulating member 18 of regulator 12 may have a generally annular form centered on central axis Z0 and comprises three rigid portions 20 interconnected in pairs by three elastic coupling links 21.

The elastic suspension 19 which connects the inertial regulating member 18 of regulator 12 to support 15, comprises three elastic suspension links 22 respectively connecting each rigid portion 20 to support 15 such that each rigid portion 20 is movable at least in rotation about central axis Z0, the inertial regulating member having a general movement that is substantially of rotation about central axis Z0.

Each elastic suspension link 22 advantageously comprises at least one elastic arm 23, for example three elastic arms 23. Each elastic arm 23 may possibly comprise a rigid section 23A, for example toward the center of said elastic arm 23.

Due to the fact that elastic arms 23 bend when the inertial regulating member rotates, rigid portions 20 of the inertial regulating member are movable both in rotation and in radial translation relative to central axis Z0.

Support 15 may possibly have a substantially star-shaped form, with three arms 15*b* connected by a central part 15*c*.

Rigid portions 20 of the inertial regulating member 18 may each comprise a part 24 in the form of a circular are centered on central axis Z0, Parts 24 in the form of a circular arc are adjacent to one another and together form a discontinuous ring centered on central axis Z0.

Each elastic arm 23 may extend substantially radially relative to central axis Z0 and connect a part 24 in the form of a circular arc of one of rigid portions 20, to abovementioned central part 15*c* of support 15.

Parts 24 in the form of a circular arc each extend angularly between a first end 25 and a second end 26 which overlap one another in an angular direction. For example, each first end 25 can form a first finger 25*a* extending toward adjacent rigid portion 20 and each second end 26 can form a second finger 26*a* extending toward adjacent rigid portion 20, each first finger 25*a* outwardly covering the second finger 26*a* of adjacent rigid portion 20.

Second end 26 of each part 24 in the form of a circular arc may be extended significantly radially inward by a rigid arm 27 terminating in a jaw 28 extending angularly beyond the second end, in the direction of adjacent rigid portion 20.

Each elastic coupling link 21 may comprise at least one elastic coupling arm 21*a* (here two parallel elastic coupling arms 21*a*) extending substantially radially relative to central axis Z0 and connecting jaw 28 of each rigid portion 20 to first end 25 of circular arc part 24 of adjacent rigid portion 20.

The displacements of each rigid portion 20 of the inertial regulating member may be limited by movement limitation means which limit movement relative to support 15, in order to limit the displacements, in particular angular, of rigid portions 20 and to protect the planar mechanism 13 in case of impacts or more generally during strong acceleration.

These movement limitation means may comprise a slot 29 formed in each circular arc part 24 and extending angularly around central axis Z0, and a pin 30 which is secured to support 15 (in fact, fixed to support plate 14*a*) and which is positioned in slot 29. Slots 29 follow the kinematics of rigid portions 20 during rotational movement of the inertial regulating member 18. Slots 29 are therefore not of circular form centered on central axis Z0, but here are rather in the form of spiral segments.

The abovementioned movement limitation means, or similar movement limitation means, could be provided in the other embodiments of the invention.

Anchor 11 and energy distribution member 10 may be arranged inside the inertial regulating member 18.

Anchor 11 is a rigid part which may comprise a rigid body 31 adjacent to circular arc part 24 of one of rigid portions 20 of the inertial regulating member. Anchor 11 may further comprise a rigid driving arm 32 which is integral to rigid body 31 and which extends toward one of the arms 15*b* of the support from said rigid body 31.

Anchor 11 is elastically connected to support 15 so as to be able to oscillate, for example in a movement substantially in rotation about an axis Z2 perpendicular to plane XY. The oscillations of anchor 11 are controlled by the inertial regulating member 18.

To this effect, rigid arm 27 of one of rigid portions 20 of the inertial regulating member can be extended inwards by an additional rigid arm 33 of which the free end is connected to the free end of rigid driving arm 32 by an elastic driving arm 34.

Advantageously, anchor 11 can be connected to support 15 by an elastic suspension, comprising for example two elastic anchor suspension arms 35 converging substantially towards axis Z2. It is possible that elastic arms 35 connect rigid body 31 to free end 15*e* of one of arms 15*b* of the support.

Anchor 11 comprises two stopping means 36, 37 in the form of spurs protruding substantially towards axis Z1, which are adapted to engage with energy distribution member 10.

Anchor 11 is thus controlled by said inertial regulating member to regularly and alternately block and release energy distribution member 10 via stopping means 36, 37, such that said energy distribution member 10 moves step by step in direction 16 under the urging of energy storage device 8 in a cycle of repetitive movement, and said anchor 11 is further adapted to transfer mechanical energy to regulating member 18 during this cycle of repetitive movement, in a manner known per se.

In one exemplary embodiment, the total mass of the oscillating parts of the mechanism may be approximately 0.33 g and their inertia approximately 20.19 10-9 kg·m2, the oscillation frequency of the inertial regulating member is approximately 18 Hz, and the rotational stiffness of the mechanism is approximately 2.58 10-4 Nm/rad. Such a mechanism provides very good isochronism, which leads to a very good precision in timekeeping.

Second Embodiment

Figure 6:
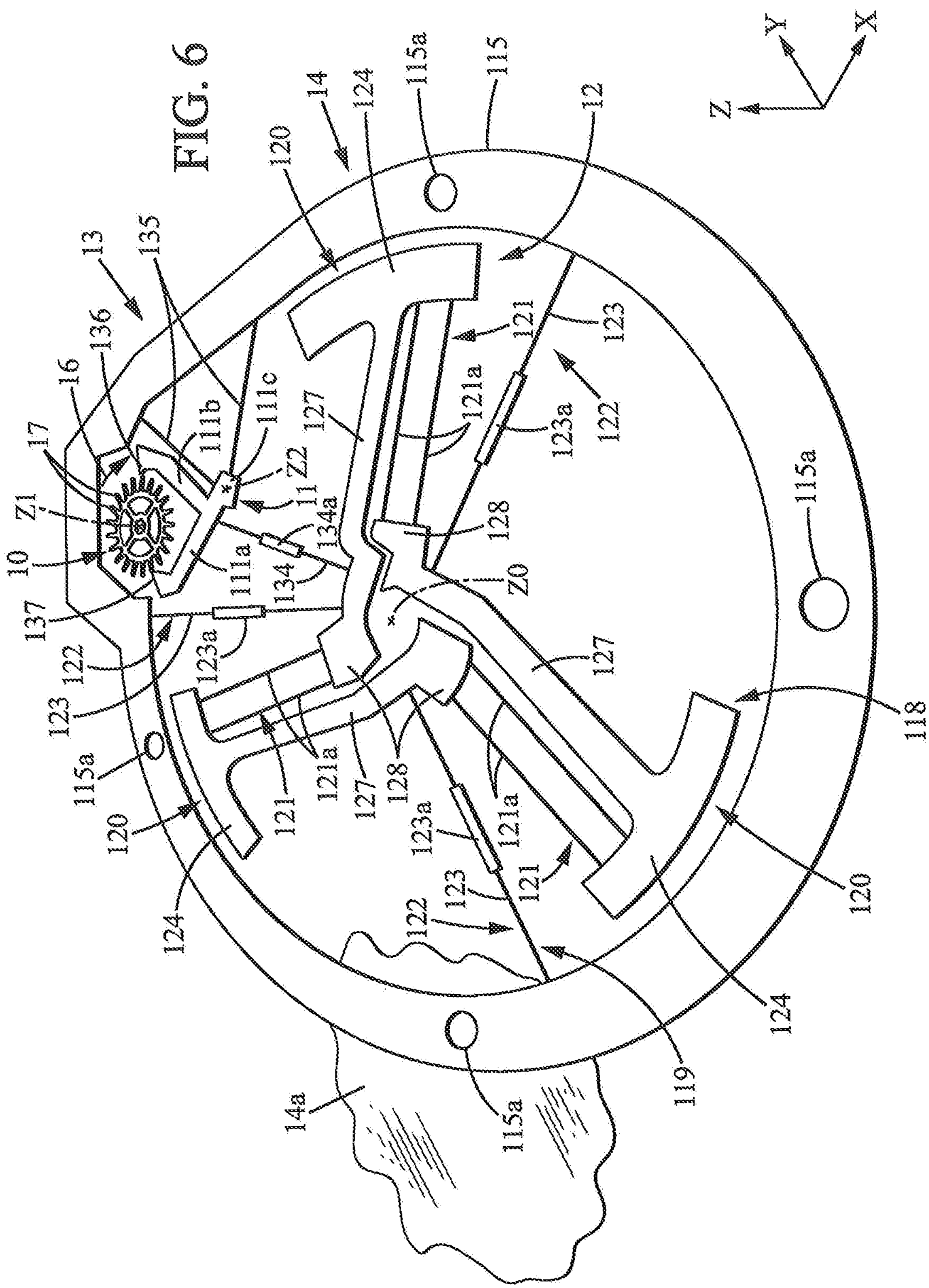
FIGS. 6 to 8 are views respectively similar to FIGS. 3 to 5, for a second embodiment of the invention.
Figure 7:
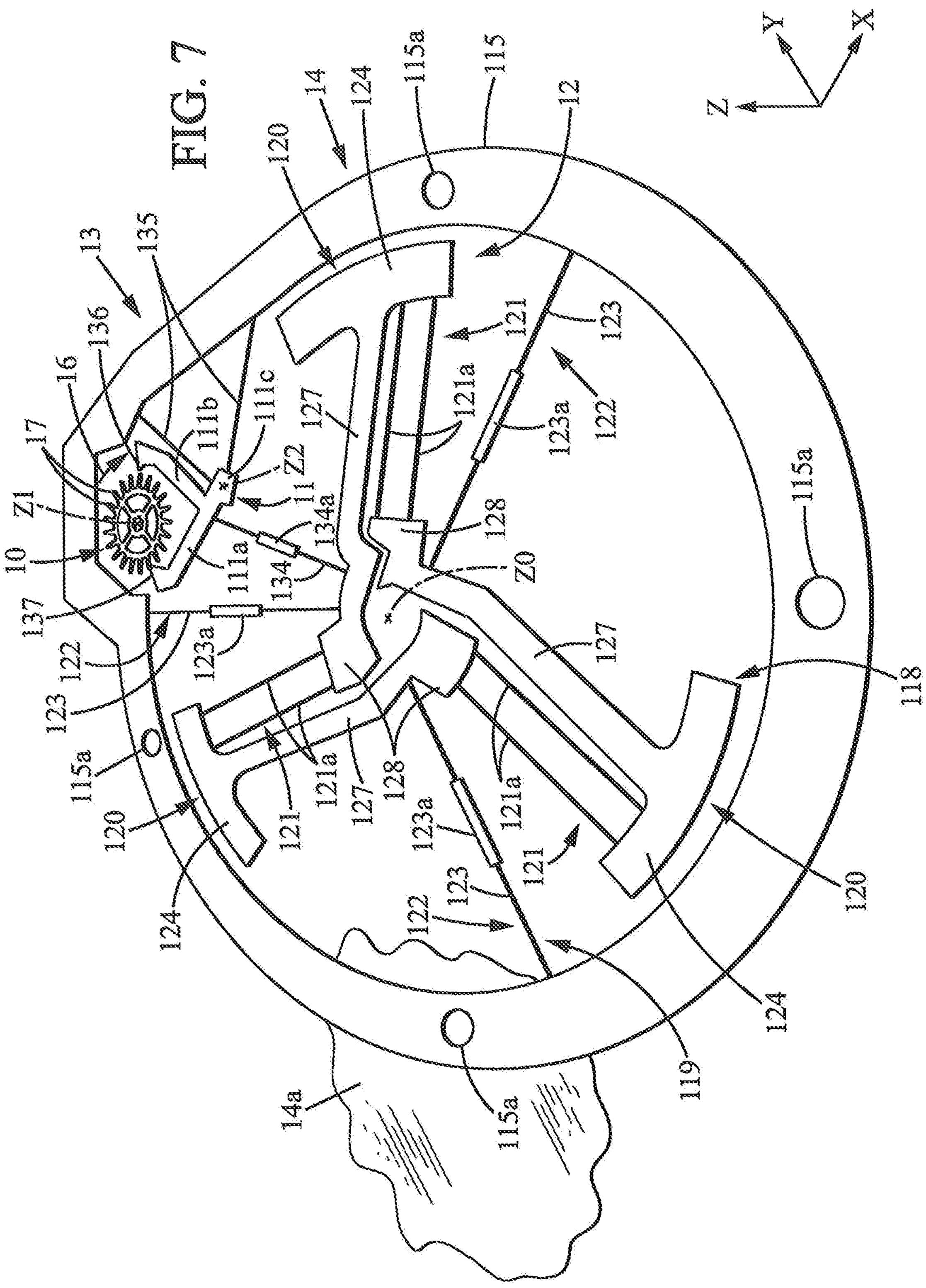
Figure 8:
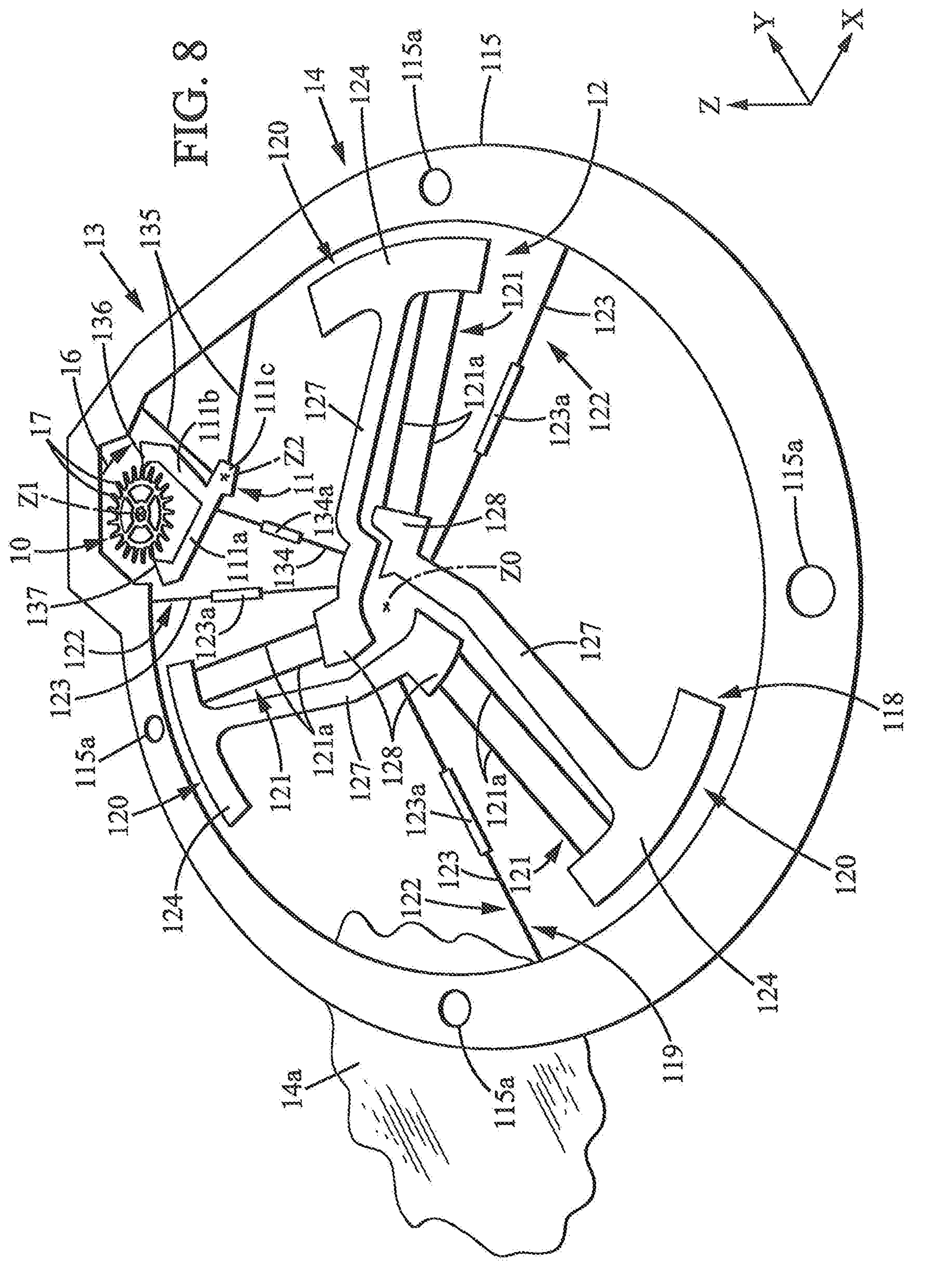

In the second embodiment of the invention, represented in FIGS. 6 to 8, the number n remains equal to 3. Inertial regulating member 118 of regulator 12 comprises three rigid portions 120 interconnected in pairs by three elastic coupling links 121.

Elastic suspension 119, which connects the inertial regulating member 118 of regulator 12 to support 115, comprises three elastic suspension links 122 respectively connecting each rigid portion 120 to support 115 such that each rigid portion 120 is movable at least in rotation about central axis Z0.

Each elastic suspension link 122 advantageously comprises at least one elastic arm 123, fore example three elastic arms 123. Each elastic arm 123 may possibly comprise a rigid section 123*a*, for example toward the center of said elastic arm 123.

Due to the fact that elastic arms 123 bend when the inertial regulating member rotates, rigid portions 120 of the inertial regulating member are movable both in rotation and in radial translation relative to central axis Z0.

Support 115 may possibly have an annular shape surrounding regulator 118, energy distribution member 10, and anchor 11.

Rigid portions 120 of inertial regulating member 118 may each comprise a part 124 in the form of a circular arc centered on central axis Z0. Parts 124 in the form of a circular arc are here relatively distanced from one another in the circumferential direction.

Each rigid portion 120 may further comprise a rigid arm 127 which extends substantially radially inward from part 124 in the form of a circular arc, up to a central end 128 in the form of a heel. Each elastic arm 123 may extend substantially radially relative to central axis Z0, between central end 128 of one of rigid parts 120 and support 115, passing between two adjacent parts 124.

Each elastic coupling link 121 may comprise at least one elastic coupling arm 121*a* (here two parallel elastic coupling arms 121*a*) extending substantially radially relative to central axis Z0 and connecting central end 128 of each rigid portion 120 to circular arc part 124 of adjacent rigid portion 120.

Anchor 11 is a rigid part which may comprise for example two integral arms 111*a*, 111*b* forming an angle between them for example of about 90 degrees, a heel 111C here extending arm 111*a* beyond arm 111*b*.

Anchor 11 is elastically connected to support 115, so as to be able to oscillate, for example in a movement substantially in rotation about an axis Z2 perpendicular to plane XY. The oscillations of anchor 11 are controlled by regulating member 118.

To this effect, rigid arm 127 of one of rigid portions 120 of the inertial regulating member can be connected for example to arm 111*a* of the anchor by an elastic driving arm 134, possibly provided with a central rigid section 134*a*.

Advantageously, anchor 11 can be connected to support 115 by an elastic suspension, comprising for example two elastic anchor suspension arms 135 substantially converging towards axis Z2. Optionally, elastic arms 135 may connect heel 111*c* of anchor 11 to support 115.

Anchor 11 comprises two stopping means 136, 137 in the form of spurs protruding substantially toward axis Z1, which are adapted to engage with energy distribution member 10.

Anchor 11 is thus controlled by said inertial regulating member 118 to regularly and alternately block and release energy distribution member 10 via stopping means 136, 137, such that said energy distribution member 10 moves step by step in direction 16 under the urging of energy storage device 8 in a cycle of repetitive movement, and said anchor 11 is further adapted to transfer mechanical energy to the inertial regulating member 118 during this cycle of repetitive movement, in a manner known per se.

Third Embodiment

Figure 9:
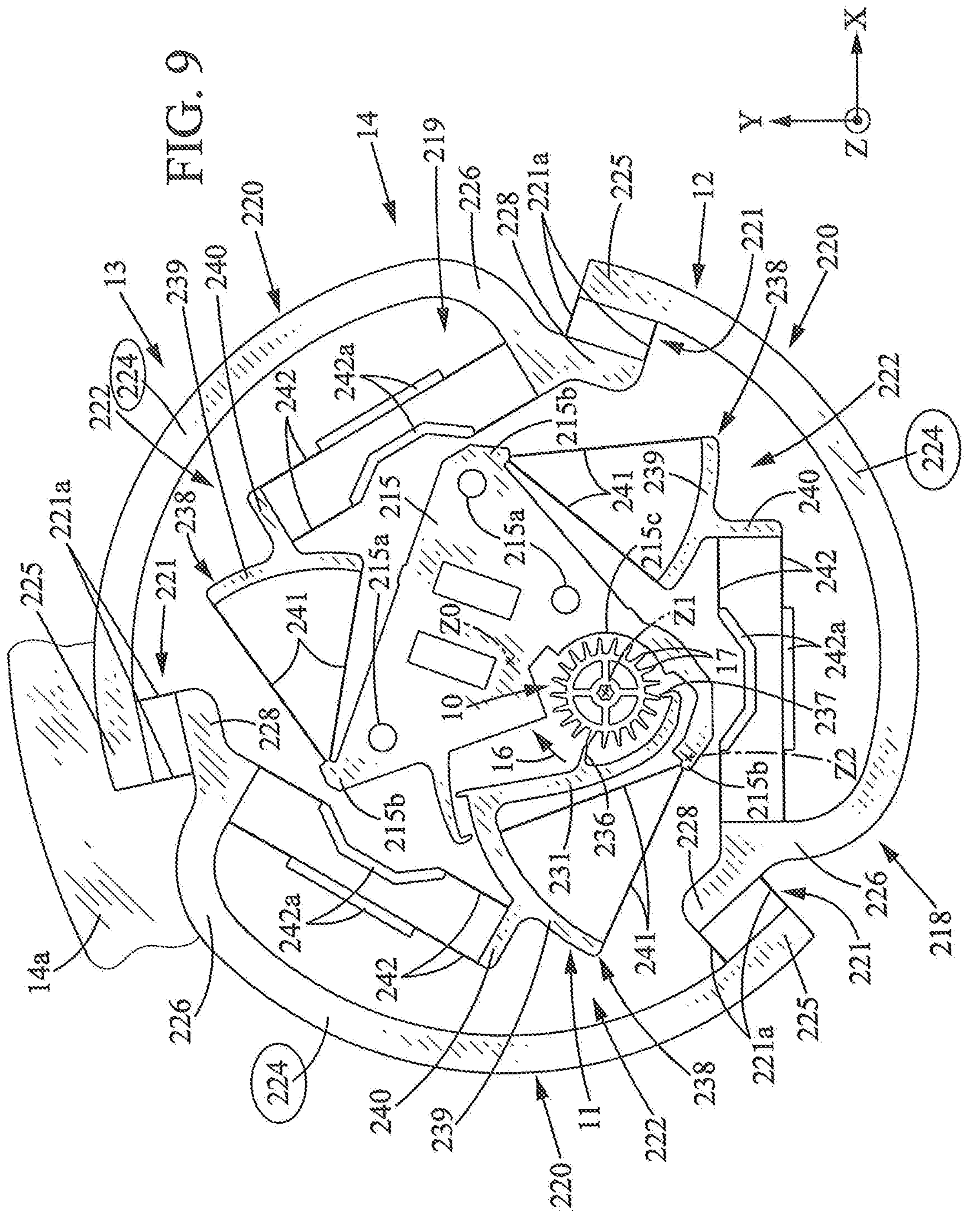
FIGS. 9 and 10 are views similar to FIG. 3, respectively for third and fourth embodiments of the invention.

In the third embodiment of the invention, represented in FIG. 9, the number n remains equal to 3. Inertial regulating member 218 of regulator 12 may have a generally annular shape centered on central axis Z0 and comprises three rigid portions 220 interconnected in pairs by three elastic coupling links 221.

Rigid portions 220 of the inertial regulating member 218 may each comprise a part 224 in the form of a circular arc centered on central axis Z0, Parts 224 in the form of a circular arc are adjacent to one another and together form a discontinuous ring centered on central axis Z0.

Parts 224 in the form of a circular arc each extend angularly between a first end 225 and a second end 226 which overlap one another in the angular direction. For example, each second end 226 may extend with an angular bias toward adjacent rigid portion 220 and radially inward, extending to a jaw 228 outwardly covered by first end 225 of adjacent rigid portion 220.

Each elastic coupling link 221 may comprise at least one elastic coupling arm 221*a* (here two parallel elastic coupling arms 221*a*) extending substantially radially relative to central axis Z0 and connecting jaw 228 of each rigid portion 220 to first end 225 of circular arc part 224 of adjacent rigid portion 220.

Support 215 is positioned at the center of the inertial regulating member 218.

Elastic suspension 219, which connects the inertial regulating member 218 of regulator 12 to support 215, comprises three elastic suspension links 222 respectively connecting each rigid portion 220 to support 215 such that each rigid portion 220 is movable at least in rotation about central axis Z0.

Each elastic suspension link 222 may for example connect support 215 (for example corner 215*b* of support 215 when this support has a substantially triangular shape as in the example represented).

Each elastic suspension link 222 may possibly comprise an intermediate rigid body 238 which comprises for example an arched part 239 having its concavity oriented towards corresponding corner 215*b* of support 215, and a rigid linking arm 240 substantially oriented away from said corner 215*b*.

Arched part 239 may be connected to said corner 215*b* for example by two elastic arms 241 converging toward corner 215*b*.

Rigid linking arm 240 may be connected to second end 226 of corresponding circular arc part 224, for example by two parallel elastic arms 242, which could possibly comprise rigid central sections 242*a*.

Anchor 11 and energy distribution member 10 may be positioned inside the inertial regulating member 218, for example at least partly in a recess 215*c* created in support 215.

Anchor 11 may be formed by a rigid arm 231 which runs parallel to one of flexible arms 241 of one of elastic links 222, extending from one end of corresponding arched part 239. Rigid arm 231 comprises two stopping means 236, 237 in the form of spurs protruding substantially toward axis Z1, which are adapted to engage with energy distribution member 10.

Fourth Embodiment

Figure 10:
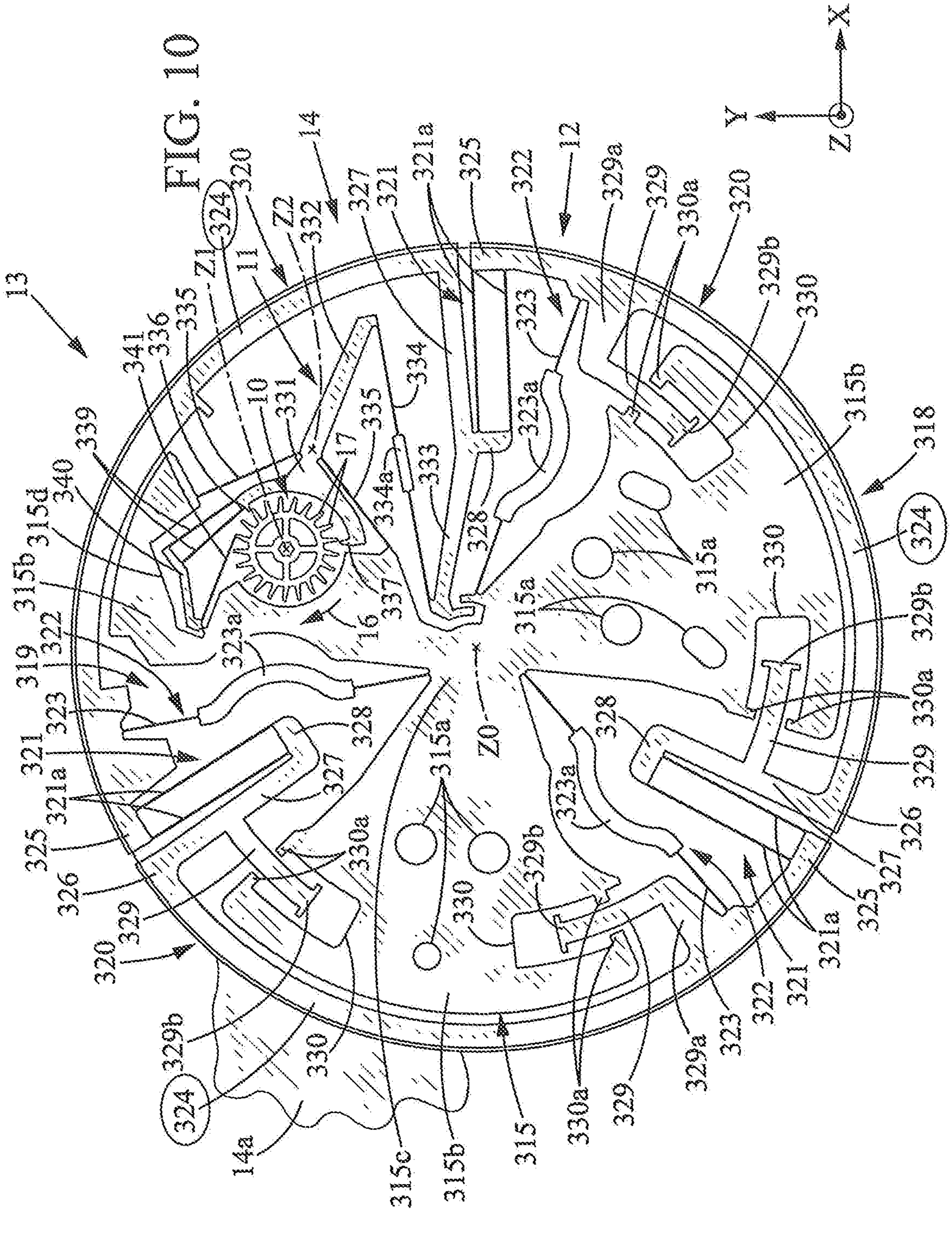

In the fourth embodiment of the invention, represented in FIG. 10, the number n remains equal to 3. Inertial regulating member 318 of regulator 12 may have a generally annular shape centered on central axis Z0, and comprises three rigid portions 320 interconnected in pairs by three elastic coupling links 321.

Elastic suspension 319, which connects the inertial regulating member 318 of regulator 12 to support 315, comprises three elastic suspension links 322 respectively connecting each rigid portion 320 to support 315 such that each rigid portion 320 is movable at least in rotation about central axis Z0.

Each elastic suspension link 322 advantageously comprises at least one elastic arm 323, for example three elastic arms 323. Each elastic arm 323 may possibly comprise a rigid section 323*a*, for example toward the center of said elastic arm 323.

Due to the fact that elastic arms 323 bend when the inertial regulating member rotates, rigid portions 320 of the inertial regulating member are movable both in rotation and in radial translation relative to central axis Z0.

Support 315 may possibly have a substantially star-shaped form, with three arms 315*b* connected by a central part 315*c*.

Rigid portions 320 of the inertial regulating member 318 may each comprise a part 324 in the form of a circular arc centered on central axis Z0. Parts 324 in the form of a circular arc are adjacent to one another and together form a discontinuous ring centered on central axis Z0.

Each elastic arm 323 may extend substantially radially relative to central axis Z0 and connect a part 324 in the form of a circular arc of one of rigid portions 320, to abovementioned central part 315*c* of support 315.

Parts 324 in the form of a circular arc each extend angularly between a first end 325 and a second end 326. Second end 326 of each part 324 in the form of a circular arc may be extended significantly radially inward by a rigid arm 327 terminating in a jaw 328 extending angularly beyond the second end, in the direction of adjacent rigid portion 320.

Each elastic coupling link 321 may comprise at least one elastic coupling arm 321*a* (here two parallel elastic coupling arms 321*a*) extending substantially radially relative to central axis Z0 and connecting jaw 328 of each rigid portion 320 to first end 325 of circular arc part 324 of adjacent rigid portion 320.

The displacements of at least some rigid portions 320 of the inertial regulating member may be limited by movement limitation means which limit movement relative to support 315, in order to limit the displacements, in particular angular, of rigid portions 320 and to protect the mechanism in case of impacts or more generally during strong acceleration.

These movement limitation means may comprise a rigid movement limitation arm 329 which is part of at least one rigid portion 320 of the inertial regulating member 318, and two additional movement limitation members 330*a* which are part of support 315 and radially frame said rigid movement limitation arm 329, said rigid movement limitation arm extending angularly relative to central axis Z0. Rigid movement limitation arm 329 can enter a recess 330 created in support 315, The opening of said recess 330 in said support 315 is a narrow opening in plane XY, bounded by two edges which are part of said support and form said additional movement limitation members 330*a*.

Advantageously, each movement limitation arm 329 may comprise a free end provided with a head 329*b* enlarged in the radial direction, said head 329*b* being positioned in the recess 330 and being wider than the spacing between the two additional movement limitation members 330*a* which are part of the support.

Each recess 330 may substantially form a circular arc centered on central axis Z0, and each movement limitation arm may substantially form a circular arc centered on the central axis, or more advantageously a spiral segment corresponding to the kinematics of rigid portions 320 of regulating member 318.

In the example shown, one of arms 315*b* of support 315 comprises a recess 315*d* which accepts energy distribution member 10 and anchor 11, and each of the other two arms 315*c* comprises two recesses 330 whose openings face one another and respectively receive two movement limitation arms 329 extending one toward the other, which are part of rigid portions 320. One of rigid portions 320 may have no movement limitation arm 329 but is coupled to anchor 11 as will be explained below.

For example, one of the two movement limitation arms 329 of each rigid portion 320 can be integral to a support arm 329*a* extending radially inward from circular arc part 324 of this rigid portion 320, in the vicinity of first end 325 of said circular arc part 324. The other movement limitation arm 329 of the same rigid portion 320 can be attached to abovementioned rigid arm 327.

The abovementioned movement limitation means, or similar movement limitation means, could be provided in the other embodiments of the invention.

Anchor 11 is a rigid part which may comprise a rigid body 331 adjacent to circular are part 324 of one of rigid portions 320 of the inertial regulating member (the one which has no movement limitation arm 329 in the example considered). Anchor 11 may further comprise a rigid driving arm 332 which is integral to rigid body 331.

Anchor 11 is elastically connected to support 315 so as to be able to oscillate, for example in a movement substantially in rotation about an axis Z2 perpendicular to plane XY. The oscillations of anchor 11 are controlled by the inertial regulating member 318.

To this effect, rigid arm 327 of rigid portion 320 adjacent to anchor 11 can be extended inwards by an additional rigid arm 333 of which the free end is connected to the free end of rigid driving arm 332 by an elastic driving arm 334 (possibly provided with a central rigid section 334*a*).

Advantageously, anchor 11 can be connected to support 315 by an elastic suspension, comprising for example two elastic anchor suspension arms 335 converging substantially towards axis Z2.

Anchor 11 comprises two stopping means 336, 337 in the form of spurs protruding substantially towards axis Z1, which are adapted to engage with energy distribution member 10.

Anchor 11 is thus controlled by said inertial regulating member 318 to regularly and alternately block and release energy distribution member 10 via stopping means 336, 337, such that said energy distribution member 10 moves step by step in direction 16 under the urging of energy storage device 8 in a cycle of repetitive movement, and said anchor 11 is further adapted to transfer mechanical energy to the inertial regulating member 318 during this cycle of repetitive movement, in a manner known per se.

Anchor 11 may further comprise a monostable elastic member 341, which may be in the form of an elastic tab whose free end is applied to teeth 17 of energy distribution member 10, Monostable elastic member 341 may be connected to rigid body 331 of anchor 11, for example by an elastic suspension comprising two substantially parallel elastic arms 339 extending to a rigid support 340 which carries monostable elastic member 341. Monostable elastic member 341 serves to ensure that energy distribution member 10 transfers precisely determined mechanical energy to the inertial regulating member 318, at each operation cycle of the timepiece movement 3, as explained in document WO2016091951.

The invention claimed is:

1. A device for a timepiece comprising a planar mechanism extending in a mid-plane, said planar mechanism comprising:

a support, an inertial regulating member connected to the support by an elastic suspension, said inertial regulating member having a substantially axial symmetry of order n relative to a central axis orthogonal to said mid-plane and fixed relative to the support, n being a whole number at least equal to 2, wherein said inertial regulating member comprises a number n of rigid portions interconnected in pairs by n elastic coupling links, and the elastic suspension comprises n elastic suspension links respectively connecting each rigid portion to the support.

2. The device according to claim 1, wherein the inertial regulating member is movable substantially in rotation about said central axis.

3. The device according to claim 2, wherein the rigid portions of the inertial regulating member are movable both in rotation and in radial translation relative to the central axis.

4. The device according to claim 1, wherein the elastic suspension links each comprise at least one elastic arm.

5. The device according to claim 1, wherein the number n is at least equal to 3 and each rigid portion is connected to two adjacent rigid portions respectively by two elastic coupling links.

6. The device according to claim 1, wherein the number n is equal to 3.

7. The device according to claim 1, wherein the rigid portions each comprise a part in the form of a circular arc centered on the central axis.

8. The device according to claim 7, wherein the parts in the form of a circular arc are adjacent to one another and together form a discontinuous ring.

9. The device according to claim 8, wherein the parts in the form of a circular arc each extend angularly between a first end and a second end which overlap one another in an angular direction.

10. The device according to claim 8, wherein the parts in the form of a circular arc each extend angularly between a first end and a second end, the second end being extended radially by a rigid arm terminating in a jaw extending angularly beyond the second end, and each elastic coupling link comprising at least one elastic coupling arm extending substantially radially relative to the central axis and connecting said jaw of each rigid portion to the first end of the part in the form of a circular arc of an adjacent rigid portion.

11. The device according to claim 1, wherein the support comprises at least one central part surrounded by the rigid portions of the inertial regulating member, and each elastic suspension link comprises at least one elastic suspension arm extending substantially radially inward from the corresponding rigid portion to said at least one central part of the support.

12. The device according to claim 1, wherein the mechanism further comprises an anchor adapted to engage with an energy distribution member provided with teeth and intended to be urged by an energy storage device, said anchor being controlled by said inertial regulating member to regularly and alternately block and release the energy distribution member, such that said energy distribution member moves step by step under the urging of the energy storage device in a cycle of repetitive movement, and said anchor being adapted to transfer mechanical energy to said inertial regulating member during this cycle of repetitive movement.

13. The device according to claim 12, wherein said anchor is connected to the support by two elastic anchor suspension arms and to one of the rigid portions of the inertial regulating member by at least one elastic driving arm.

14. The device according to claim 13, wherein the elastic anchor suspension arms are arranged so that said anchor is movable substantially in rotation about an axis parallel to said central axis.

15. The device according to claim 13, wherein the anchor comprises a main rigid body which comprises two stopping means adapted to engage with the teeth of the energy distribution member, the main rigid body of the anchor being arranged internally relative to the part in the form of a circular arc of one of the rigid portions, and the anchor further comprising a rigid driving arm integral to the main rigid body and connected to the rigid arm of said rigid portion by said elastic driving arm.

16. The device according to claim 1, comprising movement limitation means adapted to limit the displacements of at least one of the rigid portions of the inertial regulating member relative to the support.

17. The device according to claim 16, wherein said movement limitation means limit an angular displacement of said at least one of the rigid portions of the inertial regulating member relative to the support, about the central axis.

18. The device according to claim 16, wherein said movement limitation means comprise a slot formed in said at least one of the rigid portions of the inertial regulating member and extending angularly around the central axis, and a pin integral to the support and arranged in the slot.

19. The device according to claim 16, wherein said movement limitation means comprise a rigid movement limitation arm that is part of said at least one of the rigid portion of the inertial regulating member, and two additional movement limitation members which are part of the support and which radially frame said rigid movement limitation arm, said rigid movement limitation arm extending angularly relative to the central axis.

20. The device according to claim 19, wherein the rigid movement limitation arm comprises a free end provided with a head that is enlarged in the radial direction, said head being wider than the spacing between the two additional movement limitation members that are part of the support.

21. The device according to claim 20, wherein the enlarged head can move angularly within a recess in the form of a circular arc centered on the central axis, which is formed in the support, the opening of said recess in said support being a narrow opening bounded by two edges which are part of said support and which form said additional movement limitation members.

22. The device according to claim 1, wherein the support is arranged at least partially around the inertial regulating member, each rigid portion comprising a part in the form of a circular arc centered on the central axis and a rigid arm extending from the part in the form of a circular arc to an inner end near the central axis, each elastic suspension link comprising an elastic suspension arm connecting the support to the inner end of the rigid arm and extending substantially radially relative to the central axis, and each elastic coupling link comprising at least one elastic coupling arm connecting the part in the form of a circular arc of a rigid portion to the inner end of the rigid arm of an adjacent rigid portion, said elastic coupling arm extending substantially radially relative to the central axis.

23. A timepiece movement comprising a device according to claim 1 and an energy distribution member provided with teeth and intended to be urged by an energy storage device, said device comprising an anchor adapted to engage with the energy distribution member, said anchor being controlled by said inertial regulating member to regularly and alternately block and release the energy distribution member, such that said energy distribution member moves step by step under the urging of the energy storage device in a cycle of repetitive movement, and said anchor being adapted to transfer mechanical energy to said inertial regulating, member during this cycle of repetitive movement.

24. The timepiece comprising a timepiece movement according to claim 23.

* * * * *